(12) United States Patent
Bowen et al.

(10) Patent No.: US 11,002,192 B2
(45) Date of Patent: May 11, 2021

(54) SYSTEMS AND METHODS FOR PROCESSING CARBONACEOUS FEEDSTOCK

(71) Applicant: ARB Pyrolysis, LLC, West Conshohocken, PA (US)

(72) Inventors: Mack D. Bowen, Lynn Haven, FL (US); Robert G. Kelly, Media, PA (US)

(73) Assignee: ARB Pyrolysis, LLC, Conshohocken, PA (US)

( * ) Notice: Subject to any disclaimer, the term of this patent is extended or adjusted under 35 U.S.C. 154(b) by 0 days.

(21) Appl. No.: 17/037,799

(22) Filed: Sep. 30, 2020

(65) Prior Publication Data

US 2021/0025328 A1 Jan. 28, 2021

Related U.S. Application Data

(63) Continuation of application No. PCT/US2019/058564, filed on Oct. 29, 2019.

(Continued)

(51) Int. Cl.
 *F02C 7/22* (2006.01)
 *C25B 1/02* (2006.01)
 *F23R 3/28* (2006.01)

(52) U.S. Cl.
 CPC ............... *F02C 7/22* (2013.01); *C25B 1/02* (2013.01); *F23R 3/28* (2013.01); *F05D 2220/32* (2013.01);

(Continued)

(58) Field of Classification Search
 CPC .......... F01K 23/10; F01K 23/067; F02C 3/30; F23R 3/36; C10J 2300/094; C10J 2300/0926; C10J 2300/1207
 See application file for complete search history.

(56) References Cited

U.S. PATENT DOCUMENTS 4,568,361 A 2/1986 Firey
5,095,693 A * 3/1992 Day .................... F02C 7/224
 60/775

(Continued)

OTHER PUBLICATIONS

International Search Authority (United States), International Search Report and Written Opinion, PCT/US2019/058564, dated Feb. 25, 2020.

*Primary Examiner* — Todd E Manahan
*Assistant Examiner* — Thuyhang N Nguyen
(74) *Attorney, Agent, or Firm* — Duane Morris LLP

(57) ABSTRACT

A system for producing high purity carbon monoxide and hydrogen as well as activated carbon includes a pyrolysis reactor, a gasifier, a combustion turbine, a boiler, a steam turbine, a combined cycle unit and an electrolysis unit. Liquid fuel from the pyrolysis reactor is provided to the combustion turbine. Liquid and gaseous fuels are provided to the boiler. Compressed oxygen from the electrolysis unit is provided to the combustion turbine. Electric power from the combustion turbine and steam turbine are provided to the electrolysis unit. The gasifier includes a preheat region, a gasification region, and a cooling region. $CO_2$ and $O_2$ are injected into the gasifier at multiple injection levels to create an isothermal gasification region to produce CO. The $CO_2$ and $O_2$ are preheated in a heat exchanger using the CO exiting from the gasifier prior to injection.

20 Claims, 5 Drawing Sheets

Related U.S. Application Data

(60) Provisional application No. 62/752,081, filed on Oct. 29, 2018.

(52) U.S. Cl.
CPC ...... *F05D 2240/35* (2013.01); *F05D 2260/20* (2013.01)

(56) References Cited

U.S. PATENT DOCUMENTS

| | | |
|---|---|---|
| 5,331,806 A | 7/1994 | Warkentin |
| 7,786,327 B2 * | 8/2010 | Calderon ................ C10J 3/64 564/63 |
| 2002/0095866 A1 | 7/2002 | Hassett |
| 2007/0284453 A1 | 12/2007 | Tsangaris et al. |
| 2008/0040975 A1 | 2/2008 | Calderon |
| 2013/0106117 A1 * | 5/2013 | Sites ..................... E21B 43/40 290/1 R |
| 2013/0161563 A1 | 6/2013 | Jiang et al. |
| 2014/0059930 A1 | 3/2014 | Zamansky et al. |
| 2015/0361833 A1 * | 12/2015 | Hinders ................ F01K 3/242 290/1 R |

\* cited by examiner

SYSTEMS AND METHODS FOR PROCESSING CARBONACEOUS FEEDSTOCK

CROSS-REFERENCE TO RELATED APPLICATIONS

This application is a continuation of International Application No. PCT/US2019/058564, filed Oct. 29, 2019, which claims priority to U.S. Provisional Patent Application No. 62/752,081, filed Oct. 29, 2018, which applications are incorporated herein by reference in their entirety.

BACKGROUND

Carbon monoxide is typically produced, along with hydrogen, by steam reforming natural gas or other light hydrocarbons. For carbon monoxide extraction, this normally requires a hydrogeneration/desulphurization reactor, a heat exchange reformer with energy supplied by fuel combustion (or by process gases), and either a cryogenic separator, a pressure swing adsorption (PSA) unit or a carbon monoxide membrane separator. Hydrogen and carbon monoxide are produced in the reforming reaction and additional hydrogen is produced by a water gas shift reactor. The hydrogen is further separated by a PSA unit.

This type of processing produces a syngas from the reformer that is a complex mixture of carbon monoxide, hydrogen, carbon dioxide, hydrocarbons, and water. Hydrogen in the mixture can be minimized by partial oxidation using catalysis.

Over the past few decades a number of different processes have been developed to thermally decompose and gasify biomass to produce charcoal, biochar, activated carbon, and liquid organic and gaseous fuels. More recently there have been significant increases in the capacity and efficiency of electrolysis systems producing pure oxygen and hydrogen at high pressures.

Further, combustion turbines (also known as gas turbines) are forms of engines typically used to produce electrical power or energy. Such combustion turbines typically operate by compressing atmospheric air to a relatively high pressure and then injecting fuel into the air and igniting the fuel. The combustion turbine can include an electric generator to convert rotation of the turbine blades to electrical energy. The compressor used to compress the atmospheric air typically consumes a large portion of the energy produced by the turbine.

SUMMARY

In one aspect, a method includes producing pressurized oxygen in an electrolysis unit. The method further includes providing the pressurized oxygen to a combustion turbine. The method further includes providing a liquid fuel to the combustion turbine such that the liquid fuel mixes with the pressurized oxygen and combusts within the combustion turbine.

In another aspect, a method includes providing a pyrolysis reactor, an electrolysis unit, a combustion turbine, and a gasifier. The method further includes introducing a feedstock into the pyrolysis reactor. The method further includes producing a liquid fuel and a char with the pyrolysis reactor. The method further includes introducing water to the electrolysis unit. The method further includes producing oxygen and hydrogen with the electrolysis unit. The method further includes introducing the liquid fuel produced with the pyrolysis reactor to the combustion turbine. The method further includes providing the oxygen produced by the electrolysis unit to the combustion turbine. The method further includes producing electrical power with the combustion turbine. The method further includes supplying the electrical power produced by the combustion turbine to the electrolysis unit. The method further includes introducing the char to the gasifier. The method further includes producing carbon monoxide with the gasifier.

In another aspect, a system includes a pyrolysis reactor, a gasifier, an electrolysis unit, and a combustion turbine. The pyrolysis reactor is configured to receive feedstock and produce char and a liquid fuel. The gasifier is configured to receive the char and produce carbon monoxide and activated carbon. The electrolysis unit is configured to convert water to oxygen and hydrogen. The combustion turbine is configured to receive the liquid fuel produced by the pyrolysis unit and to receive the oxygen produced by the electrolysis unit and to produce electrical power for use by the electrolysis unit.

In another aspect, a method includes introducing a char into a gasifier, the gasifier having a gasification region. The method further includes injecting carbon dioxide and oxygen into the gasification region of the gasifier at multiple locations in the gasification region such that the carbon dioxide and oxygen react with the char to form carbon monoxide. The method further includes withdrawing the carbon monoxide from the gasifier.

In another aspect, a gasifier includes a body defining a gasification region and a plurality of inlets to the gasification region of the body. The plurality of inlets are vertically spaced along the body. The plurality of inlets are configured for the passage of carbon dioxide and oxygen into the gasification region of the body.

In another aspect, a method includes providing a gasifier for receiving a char, the gasifier having a gasification region. The method further includes introducing the char to the gasifier. The method further includes continuously moving the char through and outwardly from the gasifier. The method further includes preheating carbon dioxide and oxygen. The method further includes injecting the carbon dioxide and oxygen into a gasification region of the gasifier in multiple locations. The method further includes reacting the char with the carbon dioxide and oxygen to form carbon monoxide. The method further includes passing the produced carbon monoxide through a high temperature bed of pre-heated carbon. The method further includes withdrawing the carbon monoxide from the gasifier. The method further includes withdrawing activated carbon from the gasifier.

In one embodiment, the activated carbon has a surface area of between about 600 $m^2$/gram and about 1100 $m^2$/gram.

In one embodiment, the char is at a temperature of at least 300° Fahrenheit when introduced to the gasifier.

In one embodiment, the method further includes injecting carbon dioxide into a cooling region of the gasifier vertically below the gasification region.

In one embodiment, a first gas mixture is injected into the gasification region at a first location and at a first flow rate and a second gas mixture is injected at a second location and at a second flow rate, and wherein the first location is below the second location and the first flow rate is greater than the second flow rate.

In one embodiment, the method further includes maintaining the gasification region in an isothermal state.

In one embodiment, the temperature in the gasification region is between about 1700° F. and about 1900° F.

In one embodiment, the total rate of carbon dioxide injected is between 1.0 and 2.0 pounds per pound of char. In one embodiment, the total rate of carbon dioxide injected is about 1.4 pounds per pound of char.

In one embodiment, the total rate of oxygen injected is between 0.25 and 0.75 pounds per pound of char. In one embodiment, the total rate of oxygen injected is about 0.5 pounds per pound of char.

In one embodiment, the ratio of carbon dioxide to oxygen injected is between about 2:1 and about 4:1. In one embodiment, the ratio of carbon dioxide to oxygen injected is about 2.8:1.

In another aspect, a method for producing high purity carbon monoxide and hydrogen is provided. The method includes providing a pyrolysis reactor, an electrolysis unit, a combustion turbine, and a gasifier. The method further includes introducing a feedstock to the pyrolysis reactor. The method further includes producing a liquid fuel and a char with the pyrolysis reactor. The method further includes introducing $H_2O$ to the electrolysis unit. The method further includes producing $O_2$ and H with the electrolysis unit. The method further includes introducing the liquid fuel produced by the pyrolysis reactor to the combustion turbine. The method further includes supplying the $O_2$ produced by the electrolysis unit to the combustion turbine. The method further includes producing electrical power with the combustion turbine. The method further includes introducing the char to the gasifier. The method further includes producing CO with the gasifier.

In one embodiment, the method further includes providing a portion of the $O_2$ produced by the electrolysis unit to the gasifier.

In one embodiment, the method further includes drying the feedstock prior to introduction to the pyrolysis reactor. In some embodiments, the method further includes producing a heated exhaust with a boiler and drying the feedstock with the heated exhaust from the boiler prior to introduction to the pyrolysis reactor.

BRIEF DESCRIPTION OF THE DRAWINGS

These and other features of the systems and methods described herein will be more fully disclosed in, or rendered obvious by, the following detailed description of certain exemplary embodiments of the invention, which is to be considered together with the accompanying drawings wherein like numbers refer to like parts and further wherein.

DETAILED DESCRIPTION

Figure 1:
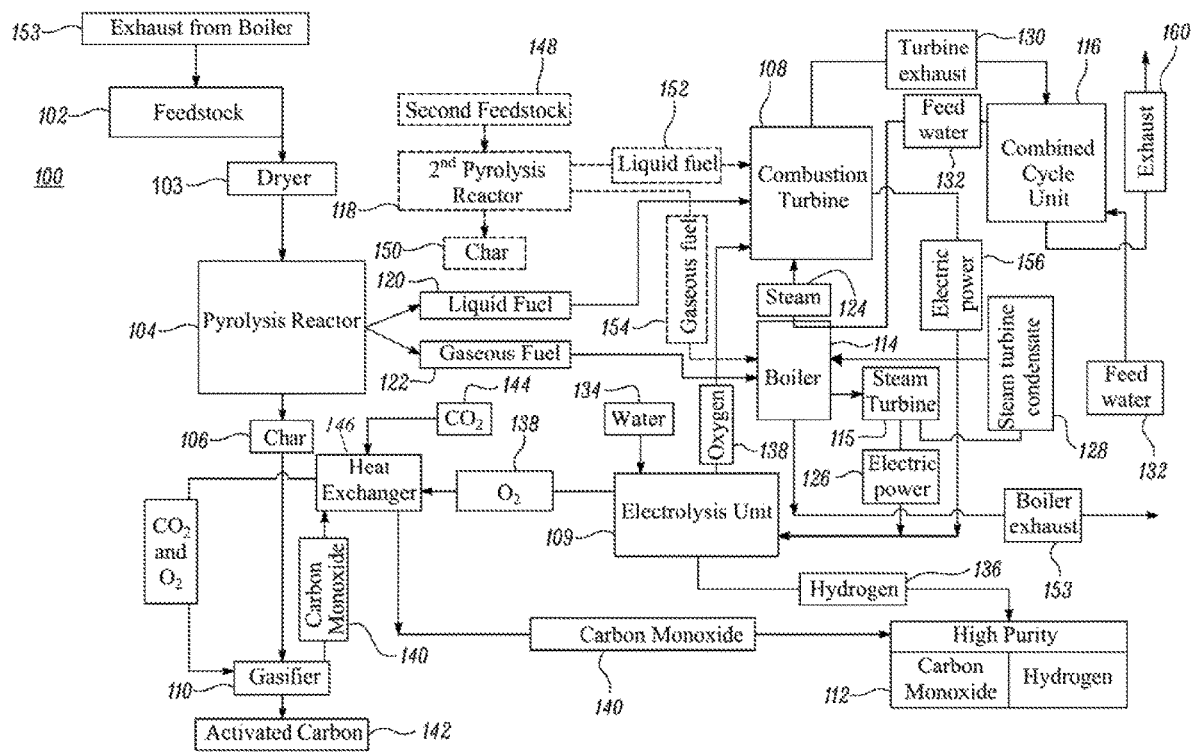
FIG. 1 is a diagram illustrating a system for processing carbonaceous feedstock according to embodiments described herein.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. Unless it is clear from the description, these relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively or operably connected" is such an attachment, coupling or connection that allows the pertinent structures to operate as intended by virtue of that relationship.

The present disclosure provides apparatuses, systems, and methods for the production of a fuel gas and a liquid fuel from a carbonaceous feedstock. In addition, the systems and methods described herein can be used to produce high purity carbon monoxide and hydrogen. This high purity carbon monoxide and hydrogen can be used for a variety of purposes, including producing a synthesis gas ("syngas"). In addition, the apparatuses, systems, and methods can also produce activated carbon.

Overall System Description

FIG. 1 shows a diagram illustrating a system 100 for processing carbonaceous feedstock according to at least one embodiment. The system 100 can include a pyrolysis reactor 104, a combustion turbine 108, an electrolysis unit 109, a gasifier 110, a boiler 114, a steam turbine 115, and a combined cycle unit 116. In some embodiments, the system 100 further includes a second pyrolysis reactor 118. It should be understood that the system 100 can further include a number of other components and systems, as described herein and as would be understood by one of skill in the art.

A feedstock 102 is provided to the pyrolysis reactor 104. The feedstock 102 can be any carbonaceous feedstock. In one embodiment, the feedstock 102 is pelletized wood, or any other appropriate wood source. In at least one embodiment, the feedstock 102 is a waste material. The use of a waste material as the feedstock may provide environmental benefits and potentially reduce operating expenses. For example, the feedstock 102 can be farm residue, forest products, municipal solid waste, or other suitable carbonaceous feedstock. In other embodiments, the feedstock 102 is coal or another combustible material. One or more of the potential feedstocks provided above may be suitable for certain processes described herein, while being inappropriate for others. For example, certain feedstocks may not be appropriate for producing liquid fuels for use in combustion turbines.

In some embodiments, prior to introduction to the pyrolysis reactor 104, the feedstock 102 is dried in a dryer 103 to minimize the moisture content in the feedstock 102. The dryer 103 can use exhaust 153 from the boiler 114, as will be described in more detail herein. Additionally or alternatively, the dryer 103 can use heat produced by the combustion turbine 108, the gasifier 110, the combined cycle unit 116, or any other portion of the system 100.

The feedstock 102 is introduced to the pyrolysis reactor 104. The pyrolysis reactor 104 converts the feedstock 102 to a char 106. The char 106 is subsequently introduced to the gasifier 110, as will be described further herein. In some embodiments, the feedstock 102 is a single stream of uniform biomass, which may provide consistency of the resulting char. The pyrolysis reactor 104 also produces liquid 120 and gaseous 122 fuels for use in power generation, as will be described further herein.

The fuel 120, 122 produced in the pyrolysis reactor 104 is provided to one or more power generation units. The power generation units can be, for example, the combustion gas turbine 108, utilizing the liquid fuel 120, and the boiler 114, utilizing the liquid 120 and/or gaseous 122 fuels. The power generation units (e.g., the gas turbine 108 and/or the boiler 114) can produce power for operating electrolysis and other processes. For example, electrical power 156 can be produced by the combustion turbine 108 and provided to the electrolysis unit 109. In addition, as noted above, the hot exhaust gases generated by the power generation units (e.g., the gas turbine 108 and/or the boiler 114) can be used to dry the feedstock 102 prior to the feedstock being introduced into the pyrolysis reactor 104 to improve the performance of the pyrolysis reactor 104 and to increase the amount of energy recovered from the power generation units. Because high purity fuels (e.g., the liquid fuel 120 and the gaseous fuel 122) are produced by the pyrolysis reactor 104, the exhaust gases produced by the combustion units may be free from contaminants such that the exhaust gases can be used to dry the feedstock 102 without introducing unwanted contaminants into the feedstock 102.

A steam turbine 115 can be operatively coupled to the steam boiler 114 such that steam 124 from the boiler 114 is provided to the steam turbine 115. The steam turbine 115 can produce electrical power 126 for use in the electrolysis unit 109. The condensate 128 produced in the steam turbine 115 can be returned to the boiler 114 for continued use. The combined cycle unit 116 can also use the exhaust 130 of the combustion turbine 108 to heat the heat feed water 132 that is provided to the boiler 114. Further, the combined cycle unit 116 can condense water out of the turbine exhaust 130 for heating the feed water 132. The feed water 132 that is heated by the turbine exhaust 130 can be maintained separate from the main boiler water to maintain a high level of purity as illustrated in FIG. 1 by the continuous line from the combined cycle unit 116, through the boiler 114, and to the combustion turbine 108. This relatively pure feed water 132 can be converted to steam 124 in the boiler 114 and fed back to the combustion turbine 108 to control combustion within the combustion turbine 108, as described herein. The preheating of the feed water 132 by the combined cycle unit 116 can reduce the energy input requirements for the boiler 114.

The electrolysis unit 109 is used to convert water 134 into hydrogen 136 and oxygen 138. The hydrogen 136 can be stored for subsequent use in an output storage unit 112. A portion of the oxygen 138 is provided to the char gasifier 110 where it is used to process $CO_2$ and char into high purity CO, as will be described further herein. Additional oxygen 138 produced by the electrolysis unit 109 can be used in other processes. For example, oxygen 138 can be injected into the combustion turbine 108 (as described herein) to ensure complete combustion of the liquid fuel 120 in the combustion turbine 108 and to produce an oxygen-rich exhaust from the combined cycle unit 116, which can then be used for combustion in the boiler 114. In one embodiment, the oxygen 138 supplied to the combustion turbine 108 also increases the efficiency of the combustion turbine 108, as will be described herein. In addition, excess oxygen in the oxygen-rich exhaust of the combined cycle unit 116 can be directed to the boiler 114 to reduce air requirements, or for other applications.

The gasifier 110 converts the char 106 to a gas output including carbon monoxide 140. In addition to producing the carbon monoxide 140, in at least one embodiment, the gasifier 110 produces activated carbon 142. Oxygen 138 is provided to the gasifier 110 from the electrolysis unit 109. The oxygen 138 preferably contains little or no moisture when provided to the gasifier 110. In addition, carbon dioxide 144 is provided to the gasifier. The system 100 can further include a heat exchanger 146 to allow carbon monoxide 140 exiting the gasifier 110 to heat the oxygen 138 and carbon dioxide 144 prior to injection of the oxygen 138 and carbon dioxide 144 into the gasifier 110.

The carbon dioxide 144 can be, for example, captured and/or cleaned from smokestacks of nearby facilities, collected through atmospheric capture systems, or purchased on the commodity market. The use of carbon dioxide in the processes described herein may reduce the amount of carbon dioxide present in the atmosphere and recycles the carbon dioxide to produce high purity CO, which can be used to produce liquid fuels or for other purposes. As such, in some embodiments, a waste material feedstock 102 is pyrolized and the char 106 generated from the feedstock 102 is used with captured carbon dioxide 144 and oxygen 138 to produce two useful products, carbon monoxide 140 and activated carbon 142. The carbon monoxide 140 can be stored in the storage unit 112. Although the carbon monoxide and hydrogen are shown in a single storage unit, it should be understood that the carbon monoxide and hydrogen can be stored in any appropriate location and in any number of containers, or put directly to use in catalysis or other processes.

Optionally, a second pyrolysis reactor 118 can be used, as illustrated in FIG. 1. The second pyrolysis reactor 118 can produce char 150, liquid fuel 152, and gaseous fuel 154. The inclusion of the second pyrolysis reactor 118 can allow for an increase in the production rate of liquid and gaseous fuels. Additionally, or alternatively, the second pyrolysis reactor 118 can also allow for a diversity of feedstocks to be used in the process. For example, some types of feedstock are a good source for generating liquid or gaseous fuels, while not being suitable for producing char of a sufficiently uniform quality for use in gasification. Hence, in some embodiments, liquid and gaseous fuels are produced by two reactors (e.g., pyrolysis reactor 104 and second pyrolysis reactor 118), while only one reactor (e.g., pyrolysis reactor 104) produces material for use in gasification. The use of the second pyrolysis reactor 118 is optional based on size, purpose, and operating parameters of the production system.

In one embodiment, a first reactor (e.g., pyrolysis reactor 104) produces liquid fuel having 15% moisture content on a wet basis (MCW) and a second reactor (e.g., pyrolysis reactor 118) produces a lower moisture liquid fuel, such as a liquid fuel with 13% MCW. The latter will have a higher dry heating value and the two fuels may be mixed at a ratio such that the mixed fuel has a constant dry heating value with only slight variations in the moisture content. The mixture may be a strong emulsion, and if processed and stored properly, can be used as a combustion turbine fuel.

Although a first 102 and second 118 pyrolysis reactor is described herein and shown in the exemplary embodiment illustrated in FIG. 1, it should be understood that the system 100 can include any number of pyrolysis reactors. For example, multiple smaller reactors can be used in place of one larger reactor. The number of pyrolysis reactors used can be determined during project planning based on the needs of the project.

Pyrolysis Reactor

As described above, the fuel 120, 122 for the power generation units (e.g., the combustion turbine 108 and/or the boiler 114), as well as the char 106 for the gasifier 110, may be produced in one or more pyrolysis reactors (e.g., pyrolysis reactor 104). In one embodiment, the pyrolysis reactor 104 can be a vertical-shaft continuous counter flow reactor. The pyrolysis reactor 104 can operate in a starved air state with steam injection and use various carbonaceous feedstocks (as described above) to produce the liquid fuel 120, the gaseous fuel 122, and the char 106.

As described above, the feedstock material can be any suitable carbonaceous material. In one embodiment, the feedstock material comprises wood pellets. Optionally, to improve the quality of the fuel produced by the pyrolysis reactor 104, the wood pellets are first dried (e.g., in dryer 103 using exhaust heat 153 produced by the boiler 114) and slowly heated prior to entering the pyrolysis reactor 104. For example, the feedstock 102 can be dried to 8% to 10% moisture content. In other embodiments, the feedstock 102 (e.g., wood pellets) is provided at 8% to 10% moisture content upon arrival and can be used directly in the pyrolysis reactor 104 without first being dried. In the pyrolysis process, the pellets of the feedstock 102 are completely dried and heated to 400° F. to 500° F. at which temperature the feedstock 102 goes through a highly exothermic decomposition process, producing water vapor (around 20% yield based on a dry wood feedstock), an off-gas mixture, and charcoal. The discharged charcoal can be at a temperature of about 300° F. or higher. The off-gases, typically at 350-400° F., can be processed to remove entrained solids and sludge, which can be recycled to the pyrolysis reactor 104. The off-gases are cooled to produce the liquid fuel 120 and the gaseous fuel 122, as shown in FIG. 1.

After the exothermic reaction, the charcoal is passed slowly downward through a deep, increasing temperature region while adding air and steam. As it does so, the material de-volatizes to a zero volatile char at about 1400° F. In one embodiment, the pyrolysis unit produces a volatile free char at a maximum temperature of between about 1400-1900° F., typically with a surface area up to 440 meters squared per gram, with an ash-free yield of greater than or equal to 0.21 lb ash-free char/lb dry feed. In one embodiment, the pyrolysis temperature is 1800° F. and the char pellets have a surface area of about 400 to 440 meters squared per gram.

Through the use of a slow pyrolysis reaction in a vertical bed, a liquid fuel 120 with low concentrations of contaminants, such as potassium, can be produced. Such a liquid fuel can be used in the combustion turbine 108 with little, or no, additional treatment, as described herein. The pyrolysis reactor can also produce the gaseous fuel 122 for use in the boiler 114. Excess liquid fuel 120 can also be provided to the boiler 114.

Combustion Turbine

In at least one embodiment, as described above, the liquid fuel 120 from the pyrolysis reactor 104 is provided to the combustion turbine 108. The combustion turbine 108 can include, or be coupled to, an electric generator to produce electricity 156 to be used by the electrolysis unit 109. As described above, the combustion turbine 108 can also produce exhaust heat 130 for use in the combined cycle unit 116, thereby increasing the efficiency of the boiler 114. In some embodiments, excess oxygen can be supplied to the combustion turbine 108 to more completely burn the fuel. In such embodiments, the exhaust from the combined cycle unit 116 may be high in oxygen and can be used in the boiler 114 or other applications.

Optionally, small amounts of an alcohol can be added to the liquid fuel 120 and dissolved therein prior to supplying the liquid fuel 120 to the combustion turbine 108. For example, methanol, or other suitable alcohols, can be added to the liquid fuel 120. The addition of the alcohol affects the heating value of the liquid fuel 120 and may lower the viscosity of the liquid fuel 120. In one embodiment, the liquid fuel 120 is provided to the combustion turbine 108 and the viscosity of the liquid fuel 120 is lowered by heating the fuel to 80° F.-150° F. just before injection into the combustion chamber of the combustion turbine 108. This can significantly improve atomization of the liquid fuel 120 without producing chemical changes in the fuel that can occur at higher temperatures.

Combustion gas turbines typically operate on thermal cycles. The first step in that cycle is compression of atmospheric air. In a typical system, up to 30% to 50% or more of the energy produced by the turbine is used by the compressor to compress the air. In one embodiment of the system 100 described herein, pressurized oxygen 138 is supplied to the combustion turbine 108 from the electrolysis unit 109. While low-pressure electrolysis is typically used to produce hydrogen, it also produces oxygen as a byproduct. High-pressure electrolysis units can produce products at high pressure. By using such a high-pressure electrolysis unit 109 in the system 100, the compressed oxygen from the electrolysis unit 109 can be used to increase the efficiency of the combustion turbine 108 by significantly reducing, or eliminating, the energy used by the compressor of the combustion turbine 108. The electrolysis unit 109 can be configured to produce oxygen at a desired pressure, such as, for example, 400 pounds per square inch (psi) or more.

Optionally, oxygen produced by the electrolysis unit 109 can be passed through an absorption bed to remove any trace quantities of water before use in the combustion turbine 108 and the gasification unit 110. This may be particularly important for the gasifier 110 in which the introduction of moisture could be detrimental.

In addition, high pressure, super-heated steam 124 is supplied to the combustion turbine 108 from the boiler 114 for temperature control and to increase the enthalpy of the combustion gases. It is known that combustion of the pyrolysis liquid fuel 120 with a stoichiometric quantity of air results in very high temperatures, typically around 4000° F. or higher, if dissociation is neglected. These high temperatures are due to the low stoichiometric air-to-fuel ratio for this fuel. This low air-to-fuel ratio results in low quantities of inert nitrogen being present in this combustion process resulting in higher temperatures. This low amount of nitrogen is not sufficient to reduce the temperature of the combustion gases. In the case of the combustion turbine 108 described herein, the pressurized, superheated steam 124 may be supplied by the boiler 114 to control the temperature of the combustion gases, to supply additional energy to the overall process, and reduce the average molecular weight of the combustion gases. The steam 124 can be supplied at a selected pressure, temperature, and mass flow rate to achieve the desired results.

In some embodiments, the steam 124 is generated from feed water 132 that is heated in the combined cycle unit 116 using the hot turbine exhaust 130. This heated feed water 132 can be kept isolated from the main boiler water used in the boiler 114 to ensure that the purity of the steam 124 is maintained. The heating of the feed water 132 can include condensing liquid from the turbine exhaust 130. The use of the turbine exhaust 130 in the combined cycle unit 116 increases the utilization of the energy generated by combustion in the combustion turbine 108 and further enhances the efficiency of the system 100. In some embodiments, the boiler 114 may include two boilers or two sections: one for heating water from feed water 132 to generate high purity steam 124 for the combustion turbine 108, and the other for generating steam for the steam turbine 115. The steam going into the combustion turbine 108 has higher purity than the steam going into the steam turbine 115.

Excess oxygen (i.e., above the stoichiometric amount) can be supplied to the combustion turbine 108 to ensure complete combustion of the liquid fuel 120 and lower the temperature of combustion. The use of excess oxygen in the combustion turbine 108 can also cause the exhaust 160 of the combined cycle unit 116 to be enriched with oxygen. The water and gaseous exhaust 160 of the combined cycle unit 116 can be used to preheat the steam 124 that is used in the combustion turbine 108 or other combustion applications.

The combination of the steam 124, liquid fuel 120, and pressurized oxygen 138 may allow for the use of a combustion turbine 108 without a compressor. Alternatively, in other embodiments, a smaller (i.e., less energy demanding) compressor can be used. By reducing, or eliminating, the amount of energy used by the compressor, the available work produced by the combustion turbine 108 is significantly increased. Accounting for the water that is pumped to the high-pressure electrolysis unit 109, and the water that is pumped to the high-pressure boiler 114, the energy required to produce the pressurized oxygen 138 and steam 124 may be only about 3% of the energy that would ordinarily be required to pressurize the gases by a compressor. Further, the liquid fuel 120 requires only a small amount of energy to inject and atomize the liquid fuel 120 in the combustion chamber of the combustion turbine 108.

The properties of the liquid fuel 120, including its heating value and the contaminants present therein, are critical to the long-term performance of the combustion gas turbine 108. In some embodiments, the combustion requirements are met by controlling or treating the contaminants in the liquid fuel 120, maintaining the heating value of the liquid fuel 120 within certain limits, and balancing the mass flows of the high pressure oxygen 138, high pressure steam 124, and liquid pyrolysis fuel 120. The mass flows of the oxygen 138, steam 124, and liquid fuel 120 can be adjusted in real time to achieve the desired combustion performance. This adjustment can be performed automatically or manually. One or more sensors can be used to monitor the liquid fuel 120, oxygen 138, and steam 124 to ensure a constant enthalpy drop across the turbine blades, to monitor the performance of the turbine, and to provide the inputs for controlling the turbine. In one embodiment, the water used in the boiler to create the super-heated steam is essentially free of contaminants that would be detrimental to a combustion gas turbine.

Figure 5:
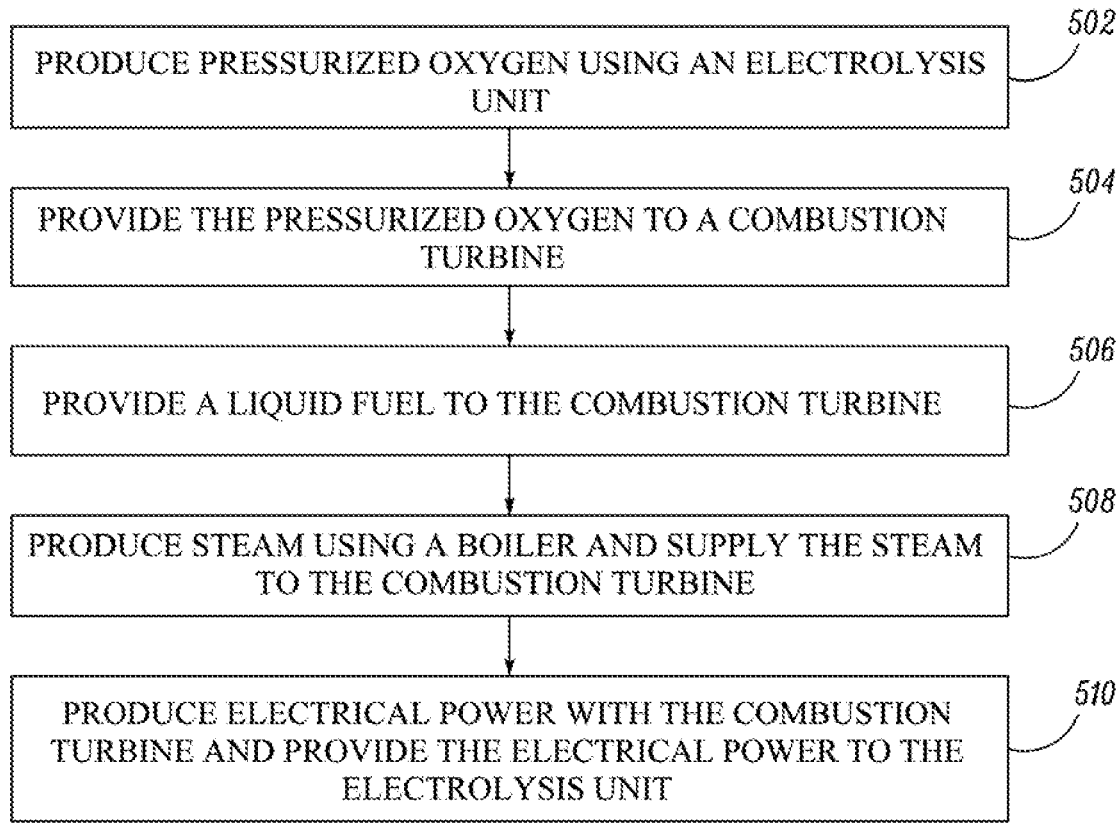
FIG. 5 is a flow diagram of a method of operating a combustion turbine with oxygen supplied by a pyrolysis reactor.

FIG. 5 is a flow diagram illustrating a method 500 of operating a combustion turbine, as described herein. At step 502, pressurized oxygen is produced using an electrolysis unit (e.g., electrolysis unit 109). At step 504, the pressurized oxygen is provided to the combustion turbine (e.g., combustion turbine 108). At step 506, liquid fuel is provided to the combustion turbine such that the liquid fuel mixes with the pressurized oxygen and combusts within the combustion turbine. Optionally, the method can further include, at step 508, producing steam using a boiler and supplying the steam to the combustion turbine. The steam can be used to control the temperature of the combustion, as described herein. Optionally, the method can further include, at step 510, producing electrical power with the combustion turbine and providing the electrical power to the electrolysis unit to operate the electrolysis process.

Gasifier

In another aspect, a gasifier and gasification process is provided for gasifying a material, such as wood char produced by the pyrolysis reactor 104, to produce (1) high purity carbon monoxide and (2) an activated carbon. The activated carbon can be produced at a specified surface area and adsorption characteristics, as will be described further herein. In one embodiment, this process is conducted in a directly fired, counter-current flow, moving packed-bed, vertical-shaft gasifier.

The gasifier is described in terms of using a material such as char developed from wood chips or pellets, however, it is contemplated within this disclosure that a variety of feedstocks can be used, as described above. The char can be produced, for example, from the feedstock in a vertical shaft, counter-flow, pyrolysis unit, as described above.

Figure 2:
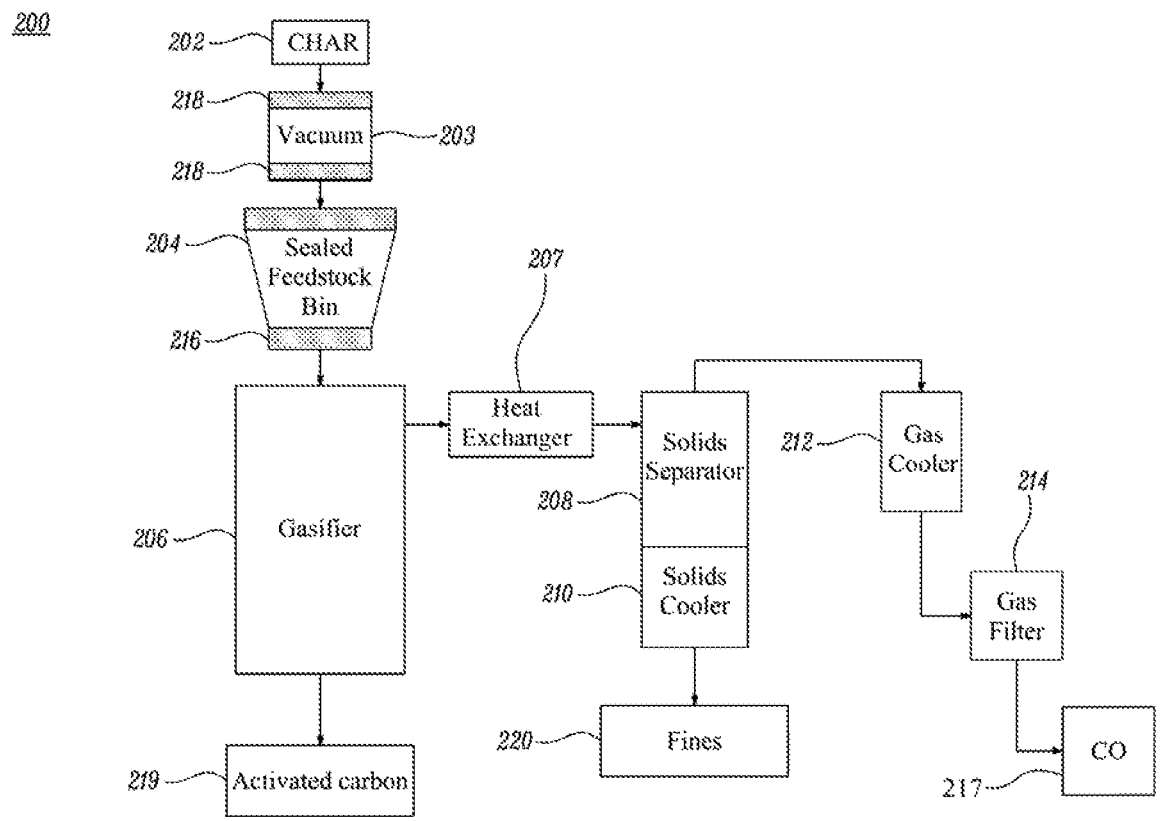
FIG. 2 shows a schematic diagram of a gasifier and associated components according to at least one embodiment described herein.

FIG. 2 shows a gasifier system 200. As described herein, the gasifier system 200 is configured to produce carbon monoxide 217 and activated carbon 219. As shown in FIG. 2, the char 202 (e.g., that is output from the pyrolysis reactor 104) is fed to the gasifier system 200. In one example, the pyrolysis reactor 104 converts a feedstock of pine pellets to char pellets at 20 lbs/ft$^3$ bulk density. The temperature of the char pellets 202 may be 300° F. or higher to prevent steam from being introduced or formed in the gasifier 206. In some embodiments, the char 202 can be degassed in a vacuum chamber 203, including double gate valves 218. The char 202 can be batch degassed at low pressure and filled with CO gas. In some embodiments, the de-gassing material that is extracted, if any, and a low quantity of CO can be provided to the combustion chamber of the boiler 114. After degassing, each batch of char 202 is discharged into a feedstock holding bin 204 of char pellets filled with CO gas (from the degassing process). Char 202, which may be in pelletized or other form, is supplied from the feedstock bin 204 to the top of the vertical bed of the gasifier 206 at a specified rate. The gasifier system 200 can include a variable feedout mechanism 216 to control the rate of feedstock introduction to the gasifier 206. By introducing the char to the gasifier 206 through this arrangement, the introduction of moisture or atmospheric contaminants into the gasifier 206 is prevented or minimized. In one embodiment, the char is at a temperature of between about 250° F. and about 400° F. when introduced to the gasifier 206. In another embodiment, the char is at a temperature of between about 250° F. and about 300° F. when introduced to the gasifier 206. In one embodiment, the char is introduced at a rate of about 50 to 5,000 pounds per hour. In another embodiment, the char is introduced at a rate of about 1,800 to about 5,000 pounds per hour. The rate of introduction can be determined, for example, based on the bulk density of the char (both in chipped and pelletized form).

As shown in FIG. 2, the gasifier system 200 can also include a heat exchanger 207, a solids separator 208, a solids cooler 210, a gas cooler 212, and a gas filter 214. In other embodiments, one or more of these components are omitted or modified. As described herein, the heat exchanger 207 is used to heat the carbon dioxide and oxygen entering the gasifier 206 using the carbon monoxide that is output from the gasifier 206. This can significantly improve the efficiency of the gasifier 206. In addition, cooling the carbon monoxide exiting the gasifier 206 can decrease the cost of the other components in the system, such as the solids separator 208 and gas cooler 212, as the maximum temperature that those components are exposed to is decreased.

The solids separator 208 can be used to separate any solid material exiting the gasifier 206 from the carbon monoxide. The solids cooler 210 can be used to cool the temperature of the solids. The fines 220 that are separated by the solids separator 208 can optionally be returned to the pyrolysis reactor 104. In some embodiments, the fines 220 are mixed with oil prior to introduction to the pyrolysis reactor 104.

The gas that exits the gasifier 206 can optionally be cooled in the gas cooler 212 and then filtered in the gas filter 214 to yield a high purity carbon monoxide 217 before being used or stored (e.g., in storage unit 112).

Figure 3:
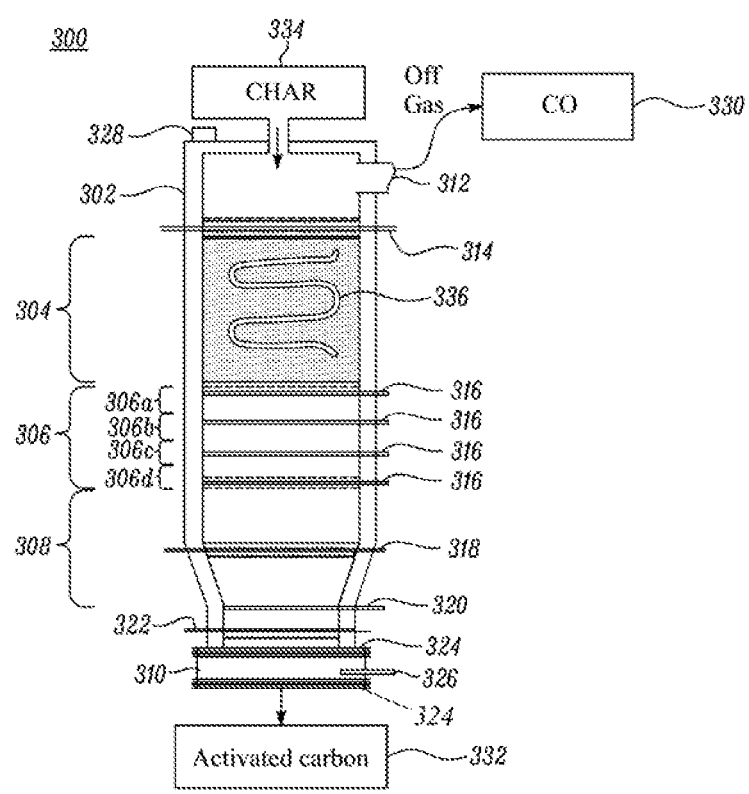
FIG. 3 shows a diagram of the gasifier of FIG. 2.

FIG. 3 shows one embodiment of a gasifier 300 configured to produce carbon monoxide 330 and activated carbon 332 from char 334. The gasifier 300 includes a body 302. The body 302 defines a preheat region 304, a gasification region 306, and a cooling region 308. The preheat region 304, gasification region 306, and cooling region 308 are arranged such that the preheat region 304 is above the gasification region 306 and the gasification region 306 is above the cooling region 308. The char 334 from the pyrolysis reactor 104 is introduced into the top of the body 302 (e.g., from the holding bin 204 shown in FIG. 2) and is spread across the top of the bed at a specified rate by one or more leveling devices 314. The leveling device 314 is, for example, a mechanical leveling device including a rabble head rotatably mounted on a shaft and supported in a drive fixture as described in U.S. Pat. No. 4,230,602, which is incorporated herein by reference in its entirety. The char so introduced is substantially continuously moved, as a packed bed and at a pre-determined input rate, downwardly through and outwardly from the bottom of the gasifier 300 while gases are withdrawn upwardly therethrough and outwardly therefrom, as will be described herein.

When introduced to the gasifier 300, the char enters the preheat region 304. As seen in FIG. 3, the preheat region 304 is positioned above the gasification region 306. As a result, the carbon monoxide that is produced in the gasification region 306 (as described in more detail herein) flows upward from the gasification region 306 and passes through the char that is in the preheat region 304. In some embodiments, the cross-sectional area of the preheat region 304 is greater than the cross-sectional area of the gasification region 306. In such embodiments, this differential in cross-sectional area may cause the velocity of the carbon monoxide to decrease as it flows through the preheat region 304. This reduces particle entrainment in the outwardly flowing carbon monoxide by reducing the pressure drop across the preheat region 304. In one embodiment, the cross-sectional area of the preheat region 304 is between about 25 square feet and about 50 square feet. In another embodiment, the cross-sectional area of the preheat region 304 is between about 75 square feet and about 175 square feet. In another embodiment, the cross-sectional area of the preheat region 304 is between about 100 square feet and about 150 square feet. In another embodiment, the cross-sectional area of the preheat region is between about 25 square feet and about 100 square feet. In another embodiment, the cross-sectional area of the preheat region is between about 50 square-feet and about 100 square-feet. In one embodiment, both the pre-heat region 304 and the gasification region 306 have cross-sectional areas of about 50 square feet.

As the gas flows upward through the preheat region 304 and toward an outlet 312 of the body 302, any carbon dioxide present within the gas can react with the deep high temperature char immediately above the gasification region 306. This ensures a high purity carbon monoxide gas flowing to the outlet 312. The depth of the preheat region 304 can be selected to ensure that substantially all of the carbon dioxide reacts with the char. For example, in one embodiment, the depth of the preheat region 304 is between about 10 feet and about 20 feet, depending on the density of the char, shape of the particles, and desired quantity of activated carbon. In another embodiment, the depth of the preheat region 304 is between about 6 feet and about 8 feet. The depth of the preheat region 304 may be greater than required to fluidize the char such that a high temperature region is formed immediately above the gasification region 306. Alternatively, or additionally, the gas passing through the preheat region 304 can be recirculated such that it passes upward through the preheat region 304 multiple times to allow for additional reaction with the char present in the preheat region 304. This may be useful in implementations in which it is not possible or not desirable to make the preheat region 304 sufficiently deep to allow all of the carbon dioxide to react with the char present therein.

In the preheat region 304, the char can be heated to any desired temperature such that the char reacts at a reasonable rate with $CO_2$ and does not over heat the carbon in the preheat region 304. For example, in one embodiment, the char is preheated to a temperature of about 1,800° F. In another embodiment, the char is preheated to a temperature of between about 1,500° F. and about 1,800° F.

Carbon monoxide gas that exits through the outlet 312—at, for example, 1000° F. to 1100° F.—can be used to preheat the $CO_2$ and $O_2$ (as a mixture or separately) (e.g., to about 900° F.) in the heat exchanger 207 (shown in FIG. 2). The heat exchanger 207 can include tubes 336 in the preheat region 304 (shown in FIG. 3) through which the $CO_2$ and $O_2$ can flow. The presence of the tubes 336 in the preheat region 304 can decrease the velocity of the CO flowing upward through the tubes 336 (due to the decrease in temperature) and thus decrease possible solids entrainment in the exiting gas. The tubes 336 can be in fluid communication with the sparger tubes 316 (described below) for injection into the gasification region 306. In some embodiments, the tubes 336 are positioned near the top of the cooling region 304. As noted above, the energy exchange may be controlled to allow the char to reach the desired temperature (e.g., 1800° F.) to allow for the trace removal of $CO_2$ immediately above the gasification region 306. Alternatively, or additionally, the heat exchanger 207 can include tubes disposed in a gas exiting duct outside the body 302.

After flowing through the preheat region 304, the char enters the gasification region 306. In addition, carbon dioxide and oxygen are introduced to the gasification region 306 through inlets, for example through sparger tubes 316. Within the gasification region 306, several reactions occur. Injected oxygen primarily reacts with carbon monoxide to form carbon dioxide. The resulting carbon dioxide, along with the injected carbon dioxide, reacts with the char to form carbon monoxide.

The gas-gas reaction is enhanced by the arrangement of the sparger tubes 316. The oxygen and carbon dioxide are introduced into the gasification region 306 at multiple levels in order to maintain a constant temperature in the gasification region 306. In one embodiment, the oxygen and carbon dioxide are introduced using sparger tubes 316 spaced approximately one foot apart vertically within the gasification region 306. The sparger tubes 316 at adjacent injection levels can be offset from one another as viewed from the top of the gasification region 306 to more fully distribute the carbon dioxide and oxygen mixture within the gasification region 306. As will be understood by one of skill in the art, the sparger tubes 316 can include many small pores that allow the $CO_2$ and $O_2$ to enter into the gasification region 306 at many locations.

The injected $O_2$ reacts quickly with the CO gas present within the gasification region 306 compared with diffusion to the solid carbon surface. Except in the lowest part of the gasification region 306 there is a continuing excess of CO compared with the relatively small amount of $O_2$ injected. Consequently, all the $O_2$ is quickly consumed by reacting with CO, thereby forming $CO_2$ gas in a gas-gas reaction. However, the $CO_2$ reacting with the solid carbon will produce a large quantity of CO resulting in a lower molar concentration of $CO_2$ as the gases flow upward.

While the gasification region 306 is described below in terms of discrete regions for ease of discussion and illustration, it should be understood that chemical reactions can take place throughout the gasification region 306. Within the gasification region 306, a plurality of injection levels can be formed. The $CO_2$ and $O_2$ can be injected into the gasification region 306 through sparger tubes 316 located at each injection level. The sparger tubes 316 can be staggered within the gasification region to provide more uniform distribution of reactions within the gasification region 306 and maintain the isothermal nature of the gasification region 306. In one embodiment, the sparger tubes 316 are vertically separated by approximately 1 foot. For example, in the embodiment illustrated in FIG. 3, the gasification region 306 shows four injection levels. It should be understood that this is exemplary only and the gasification region 306 can include any number of injection levels and will likely include substantially more than four injection levels. Each injection level can be equally spaced or, alternatively, one or more injection levels can be spaced by differing distances. Within each injection level, a gas mixture of carbon dioxide and oxygen is introduced through the sparger tubes 316 in a controlled concentration to influence the gasification of the char. The introduction of this mixture of carbon dioxide and oxygen reduces the potential of local overheating of the gasification region 306. By so distributing the endothermic gasification reactions and exothermic gas-phase-oxidation reactions throughout the gasification region 306, the solid particles of the char and gases can be maintained at a specified temperature level with little temperature variation. The rate of introduction of the carbon dioxide and oxygen at the various injection levels can be such that the solids and gases in the gasification region are maintained at a uniform temperature of about 1800° Fahrenheit, or between about 1700° F. and 1900° F. Through the use of the multiplicity of levels, the oxygen and carbon dioxide are distributed throughout the gasification region, thereby rendering the gasification region substantially isothermal.

In one embodiment, the gasification region has a cross-sectional area of up to about 50 square feet. In one embodiment, the cross sectional area is approximately 50 square feet. In another embodiment, the gasification region 306 has a cross-sectional area of between about 20 square-feet and about 50 square-feet. The cross-sectional area of the gasification region 306 can be determined based on char density, pressure, and processing rate.

The char can be moved through the gasification region 306 at a controlled rate such that the residence time of the char within the gasification region 306 can be controlled. In one embodiment, the residence time is between about 50 minutes and about 200 minutes. The residence time is controlled to permit the optimal amount of conversion of char, when reacting with $CO_2$, to CO. As the char moves through the gasification region, the surface area of the char increases.

As discussed above, oxygen and carbon dioxide are injected through the sparger tubes 316 into the bed at a plurality of levels which are vertically spaced from one another from the bottom to the top of the gasification region 306 of the gasifier 300. The rate of injection of the oxygen and carbon dioxide can be independently controlled. In one embodiment, the total rate of oxygen injection is up to about 0.6 pounds per pound of char introduced into the gasifier 300. In another embodiment, the total rate of oxygen injection is about 0.5 pounds per pound of char introduced into the gasifier 300. In one embodiment, the oxygen is injected equally in each injection level. Alternatively, in another embodiment, the oxygen is injected in different amounts in one or more injection levels.

In one embodiment, the amount of carbon dioxide injected into the gasification region 306 is substantially more than the amount of oxygen injected. In one embodiment, the total rate of carbon dioxide injected is between about 1.0 and 2.0 pounds per pound of char introduced into the gasifier 300. In one embodiment, the total rate of carbon dioxide injected is about 1.4 pounds per pound of char introduced into the gasifier 300. In one embodiment, the combined amount of oxygen and carbon dioxide injected is less than about 2.0 pounds per pound of feed char introduced into the gasifier 300. The ratio of carbon dioxide to oxygen injected may be constant throughout the gasification region. In one embodiment, the ratio of total carbon dioxide injected to total oxygen injected is about 2.8:1. In another embodiment, the ratio of total carbon dioxide injected to total oxygen injected is between about 2:1 and about 4:1. By maintaining the ratio of carbon dioxide to oxygen injected into the gasification region 306, local overheating is thereby prevented. The movement of CO from lower regions to higher regions results in a significant transfer of energy upwards in the gasifier. The oxygen is injected at a rate that is just adequate to combust primarily with the carbon monoxide, thereby providing enough thermal energy for the endothermic reaction of carbon dioxide with carbon.

In one embodiment, the ratio of carbon dioxide to oxygen is the same in each injection level. In another embodiment, the ratio of carbon dioxide to oxygen injected at the lowest region is lower than at higher levels. This lowest region may be affected by the carbon dioxide introduced to the cooling region 308. As a result, less carbon dioxide may be injected at the lowest injection level.

Multiple chemical reactions occur within the gasification region 306. These include:

$$CO + \tfrac{1}{2}O_2 \rightarrow CO_2 \qquad \text{(I) moderately exothermic}$$

$$C + CO_2 \rightarrow 2CO \qquad \text{(II) highly endothermic}$$

$$C + \tfrac{1}{2}O_2 \rightarrow CO \qquad \text{(III) moderately exothermic}$$

$$C + O_2 \rightarrow CO_2 \qquad \text{(IV) highly exothermic}$$

The reactions within each region of the gasification region will be described herein, beginning with the fourth, lowest region 306d shown in FIG. 3. Hot activated carbon flows downward from the third region 306c to the fourth region 306d. Also entering the fourth region 306d is the carbon monoxide moving upward from the cooling region 308. In addition, the desired amounts of carbon dioxide and oxygen to maintain the gasification region 306 at the selected temperature are introduced into the chamber. The fastest reaction will be carbon monoxide and oxygen (reaction I) since it is a gas/gas reaction. However, in some embodiments, there will not be enough carbon monoxide entering the fourth region 306d to react with all of the oxygen required to maintain the desired gasification temperature. Consequently, in such an embodiment, there will be some reaction of the oxygen with the solid activated carbon (reaction IV).

The gas exiting upward from the fourth region 306d is carbon monoxide, provided the proper amount of oxygen and carbon dioxide are introduced to maintain the selected temperature and supply the thermal energy for the endothermic reactions. This exiting gas from the fourth region 306d flows upward at a temperature approximately equal to the temperature of the downward flow of activated carbon particles from a higher, third region 306c. In one embodiment, the quantity of carbon monoxide entering the third region 306c from the fourth region 306d exceeds the amount that will react with all of the oxygen injected into the third region 306c to maintain the temperature and supply the endothermic reaction energy. Consequently, a portion of the carbon monoxide will react with the injected oxygen (reaction I) to produce carbon dioxide. This is in addition to the quantity of carbon dioxide injected in the third region 306c.

The same local reactions can occur in higher regions (e.g., 306a, 306b), thereby resulting in significant increases in quantities in carbon monoxide as the process moves upward through each region.

The cooling region 308 is located below the gasification region 306. The gasifier 300 can include a solids flow enhancement device 318 to ensure that material flows from the gasification region 306 to the cooling region 308. A small amount of carbon dioxide can be introduced to the cooling region 308 through a cooling sparger tube 320. The carbon dioxide acts to cool the down-flowing activated carbon. In turn, this carbon dioxide is heated as it flows upward through the cooling region 308 and toward the gasification region 306. This allows the carbon dioxide to react with the activated carbon, thereby producing carbon monoxide that flows upward through the lowest portion of the gasification region 306.

In the cooling region 308, the temperature of the activated carbon is reduced. The reduction may be the result of the inflow of carbon dioxide, as described above. This can provide several advantages: (1) recovery of energy from the activated carbon product thereby partially cooling the activated carbon before its discharge from the gasifier 300; (2) reaction of the carbon dioxide with the activated carbon to produce carbon monoxide; (3) completion of the activation process; and (4) stabilization of the gasification by introducing the carbon monoxide into the lowest gasification region 306d. In addition, a cooled surface or cooled pellets may contact the activated carbon in the cooling region to further reduce the temperature of the activated carbon.

In some embodiments, the thermal energy in the relatively small quantity of activated carbon produced will not be sufficient to fully react with the carbon dioxide introduced in the cooling region 308. The carbon dioxide introduced into the cooling region 308 is heated by the activated carbon in the cooling region and then flows upward into the gasification region 306 where it mixes with the gases injected in that region.

The activated carbon 332 is withdrawn from the bottom of the gasifier 300 through a double-gated unit 310 having upper and lower valves 324. The unit 310 can be subsequently purged with carbon dioxide introduced through a carbon dioxide inlet 326. This purging procedure prevents moisture and atmospheric contaminants from entering the gasifier 300. In one embodiment, when the upper valve 324 is opened, the carbon dioxide that is introduced into the unit 310 flows upward through the cooling region 308 and into the gasification region 306. The gasifier 300 can further include an output metering device 322 to control the flow of activated carbon into the unit 310.

The gasifier 300 can also include a pressure control vent 328 to allow for the control of the pressure within the body 302 of the gasifier 300.

The carbon monoxide product 330 from the gasification and activation reactions are drafted from the gasifier 300 through the outlet 312 as a single off-gas stream. The carbon monoxide can be separated from any exiting solids using a solids separator 208 (shown in FIG. 2). In one embodiment, the temperature of the carbon monoxide exiting the preheat region 304 is about 800° to 1100° Fahrenheit. A gas cooler 212 (shown in FIG. 2) can be used to cool the exiting carbon monoxide. Additionally, or alternatively, the CO can be cooled by a heat exchanger 207, as described above, including through tubes 336 in the preheat region 304.

In one embodiment, the resulting carbon monoxide 330 will be about 0.7 pounds per pound of char 334 introduced into the gasifier 300. In one embodiment, the exiting activated carbon 332 has a BET surface area of at least 600 $m^2$/gram. In another embodiment, the exiting activated carbon 332 has a BET surface area of about 971 $m^2$/gram. In another embodiment, the exiting activated carbon 332 has a BET surface area of between about 600 $m^2$/gram and about 1100 $m^2$/gram.

Figure 4:
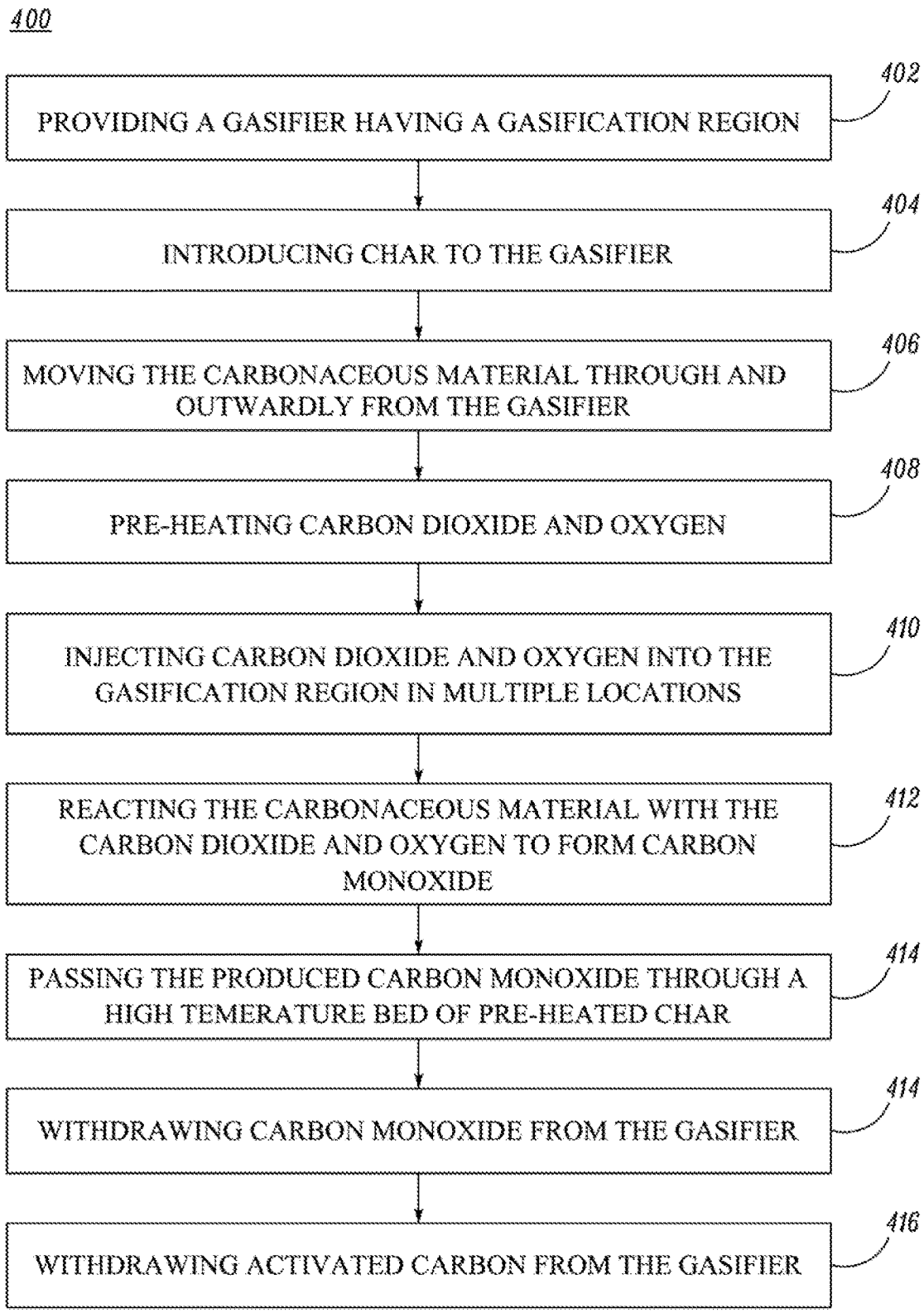
FIG. 4 is a flow diagram of a method of producing carbon monoxide and activated carbon using a gasifier.

As shown in FIG. 4, a method 400 of producing carbon monoxide and activated carbon is provided. At block 402, a gasifier having a gasification region is provided. At block 404, a char is introduced to the gasifier. At block 406, the char is continuously moved through, and outwardly from, the gasifier. At block 408, carbon dioxide and oxygen are pre-heated. At block 410 the pre-heated carbon dioxide and oxygen gas mixture is injected into the gasification region of the gasifier at multiple locations. At block 412, the char is reacted with the carbon monoxide and oxygen to form carbon monoxide. At block 414, the carbon monoxide produced in the gasification region is passed through a high temperature bed of carbon. At block 414, the carbon monoxide is withdrawn from the gasifier. At block 416, activated carbon is withdrawn from the gasifier.

Experimental Example of Gasifier

Table 1 provides properties of an exemplary gasifier. The feedstock for the gasifier presented in Table 1 is char pellets produced in a vertical bed, counter-flow pyrolysis unit operating at a maximum temperature of 1800° F. Experimental data was obtained on $CO_2$ reacting with char pine pellets from activation tests conducted at Florida State University, Panama City, Fla. and from the data regarding the reaction of carbon dioxide and carbon to high burn off values disclosed in the paper *Activation of Aspen Wood with Carbon Dioxide and Phosphoric Acid for Removal of Total Organic Carbon from Oil Sands Produced Waters: Increasing the Yield with Bio-oil Recycling*, Table 1, Materials 2016, 9, 2, A. Veksha, et. al. This experimental data covered burn-off as a function of the $CO_2$ and CO concentrations.

The char pellet processing rate is 36.44 pounds of 300° F. dry char pellet feedstock per hour per square foot of reactor cross-sectional area. The carbon dioxide and oxygen mixture was preheated to 900° F. A small quantity of carbon dioxide at 77° F. was injected in the cooling region below the gasification region. The carbon discharge temperature was determined by the quantity of 77° F. $CO_2$ injected into the cooling region below the gasification region. In the example gasifier, the carbon discharge temperature was 1518° F. with 22 lb/hr of input $CO_2$. With this information, summarized in Table 1, the values were determined of the dependent properties as a function of the surface area of the carbon product.

The results are presented in Table 2. For purposes of Table 2, the char pellets were produced in a pyrolysis reactor at a maximum temperature of 1800° F., as described above. In addition, there was no heat loss in the system due to the use of uncooled, Inconel sparger tubes. The values of process $CO_2$, process $O_2$, carbon yield, and CO production are the pounds of material input per pound of input feed (at 300° F.). Further, so that the values presented are consistent with the other data (lb/lb C), the values for the stoichiometric $CO_2$ in lb/lb CO is multiplied by the CO ratio based on the reaction:

$$C(s)+CO_2=2CO(g)$$

From these calculations, it was seen that once the product surface area, the gasification region temperature and preheat values are known, the required amount of $CO_2$ and $O_2$ can be determined. Further, since large quantities of CO are produced, all of the $O_2$ reacts immediately with the CO (a gas/gas reaction), thereby producing $CO_2$. This occurs except in the lowest injection level due to the low $CO_2$ quantity injected in the cooling region in this exemplary gasifier. It is interesting to note in Table 2, that at the highest surface area, the preheating of the injected gases significantly reduces the $O_2$ requirement. The combined quantity of $CO_2$, including the oxygen reaction producing $CO_2$, is almost equal to the stoichiometric $CO_2$, throughout the gasification region.

TABLE 1

PROPERTY VALUES OF AN EXEMPLARY GASIFIER

| PROPERTY | VALUE |
| --- | --- |
| Feedstock Material | Pine Wood Char Pellets (produced at 1800° F.) |
| Feedstock Moisture | zero |
| Feedstock Temperature | 300° F. |
| Feedstock Processing Rate | 1822 lb/hr (36.44 lb/hr-ft²) |
| Gasification Region Temperature | 1800° F. |
| Injected $CO_2$ + $O_2$ Mixture Temperature | 900° F. |
| Carbon Surface Area | variable |
| Carbon Discharge Temperature | 1518° F. |
| CO Discharge Temperature from Gasifier | 1032° F. |
| CO discharge temperature from heat exchanger | 520° F. |

TABLE 2

EXAMPLE OF THE GASIFIER USING CHAR PELLETS FEED OF 1822 LB/HR

| PROPERTY | UNITS | | | | | | | |
| --- | --- | --- | --- | --- | --- | --- | --- | --- |
| Activated Carbon Surface Area | (m²/gm) | 600 | 650 | 700 | 750 | 800 | 850 | 900 | 950 |
| Process $CO_2$ | lb/lb c | 0.443 | 0.586 | 0.728 | 0.870 | 1.013 | 1.156 | 1.298 | 1.440 |
| Process $O_2$ | lb/lb c | 0.158 | 0.208 | 0.259 | 0.309 | 0.360 | 0.410 | 0.460 | 0.511 |
| Carbon Yield | lb/lb c | 0.756 | 0.678 | 0.602 | 0.525 | 0.443 | 0.371 | 0.294 | 0.217 |
| CO Production | lb/lb c | 0.842 | 1.118 | 1.390 | 1.662 | 1.933 | 2.205 | 2.477 | 2.749 |
| Stoichiometric Carbon Dioxide | lb/lb co × lb co/lb c | 0.661 | 0.879 | 1.092 | 1.305 | 1.519 | 1.732 | 1.946 | 2.159 |
| Gasification Depth | ft. | 2.10 | 2.68 | 3.27 | 3.86 | 4.44 | 5.03 | 5.61 | 6.20 |
| Residence Time | min. | 54.2 | 69.2 | 74.2 | 93.4 | 112.7 | 131.9 | 151.1 | 170.4 |

The rate constant for this example was determined experimentally for a measured char density and burn off with units of lb. carbon burned off per lb. carbon feed per atmosphere per square foot per minute. The effect of varying concentrations (atm) was determined experimentally and a best fit exponential expression was determined for this example at 1800 degrees F. With the processing rate kept constant, a relationship exists between the depth and residence time of a carbon pellet in the burn-off, or activation, zone. The depth of the zone is proportional to the processing rate and inversely proportional to the rate constant, the pellet bulk density, and the reactants rate.

It should also be noted that interaction with incoming char feedstock cools the CO gas exiting the gasification region to only 1032° F. The bulk density of the incoming char pellets is 20 to 21 lb/ft³ and has a void fraction of about 0.44. The depth of the char heating region is larger than would otherwise be required so that a high temperature region is present immediately above the gasification region so that any $CO_2$ in the off-gas will react with the char to form CO.

The chemical kinetic analysis of the gasification region permitted a determination of the proper $CO_2/O_2$ mixture in said region. Although parameters such as the rate constants, the process $CO_2$ and $O_2$ and the char pellets feedstock processing rate can affect said distribution, the $CO_2/O_2$ distribution given in Table 2, in terms of bed depth illustrates a significant degree of uniformity due to preheating the injected gases and the ever increasing energy carried by the increasing CO mass from the lower level to the next higher level. The injected flow rates may be adjusted for the decreasing concentration of $CO_2$ and the mass and energy entering and leaving each level.

Another output from the chemical kinetic analysis was a calculation of a desired depth of the gasification region. For the example of Tables 1 and 2, with a variable carbon bulk density, to a low of 6.4 lbs per cubic foot, and with the experimentally determined rate constant of $7.979 \times 10^{-9}$ pounds of carbon per atmosphere per minute per square foot, for the carbon $CO_2$ reaction at 1,800° F., the depth of the gasification region was calculated. The results are given in Table 2. Since the processing rate was constant in said example, a simple relationship existed between said depth and the residence time of an activated carbon pellet in the gasification region. Said residence time is also given in Table 2.

As further illustration of the flexibility of this approach, the chemical kinetic analysis has shown that the depth of the gasification region is proportional to the processing rate and that it is inversely proportional to the rate constant, the char pellet bulk density, and the process $CO_2/O_2$ mixture rate. If more $CO_2$ is directed to cooling the carbon discharge region, the depth of the gasification region can be changed, somewhat, by changing the process $CO_2/O_2$ mixture.

Although the systems and processes have been described in terms of exemplary embodiments, they are not limited thereto. Rather, the appended claims should be construed broadly, to include other variants and embodiments of the systems and processes that may be made by those skilled in the art without departing from the scope and range of equivalents of the claims.

What is claimed is:

1. A method, comprising:
   producing pressurized oxygen in an electrolysis unit;
   providing the pressurized oxygen to a combustion turbine;
   introducing a feedstock into a pyrolysis reactor to produce a liquid fuel;
   providing the liquid fuel to the combustion turbine such that the liquid fuel mixes with the pressurized oxygen and combusts within the combustion turbine;
   producing steam using a boiler and supplying the steam to the combustion turbine to control a temperature of combustion of the liquid fuel;
   providing a gaseous fuel to the boiler; and
   producing heated exhaust with the boiler and drying the feedstock with the heated exhaust produced by the boiler prior to introducing the feedstock into the pyrolysis reactor.

2. The method of claim 1, further comprising pre-heating feed water for the boiler using exhaust from the combustion turbine to heat the feed water.

3. The method of claim 2, further comprising condensing liquid from the exhaust of the combustion turbine to pre-heat the feed water for the boiler, wherein the pre-heated feed water is converted to steam by the boiler, and wherein the steam is provided to the combustion turbine.

4. The method of claim 1, further comprising producing electrical power with an electric generator of the combustion turbine and providing the electrical power to the electrolysis unit.

5. A method, comprising:
   providing a pyrolysis reactor, an electrolysis unit, a combustion turbine, and a gasifier;
   introducing a feedstock into the pyrolysis reactor;
   producing a liquid fuel and a char with the pyrolysis reactor;
   introducing water to the electrolysis unit;
   producing oxygen and hydrogen with the electrolysis unit;
   introducing the liquid fuel produced with the pyrolysis reactor to the combustion turbine;
   providing the oxygen produced by the electrolysis unit to the combustion turbine;
   producing electrical power with the combustion turbine;
   supplying the electrical power produced by the combustion turbine to the electrolysis unit;
   introducing the char to the gasifier;
   producing carbon monoxide with the gasifier;
   providing a gaseous fuel to a boiler; and
   producing heated exhaust with the boiler and drying the feedstock with the heated exhaust produced by the boiler prior to introducing the feedstock into the pyrolysis reactor.

6. The method of claim 5, further comprising producing the gaseous fuel with the pyrolysis reactor.

7. The method of claim 6, further comprising pre-heating feed water for the boiler using exhaust from the combustion turbine.

8. The method of claim 7, further comprising condensing liquid from the exhaust of the combustion turbine to pre-heat the feed water for the boiler, wherein the pre-heated feed water is converted to steam by the boiler, and wherein the steam is provided to the combustion turbine.

9. The method of claim 5, further comprising drying the feedstock prior to introducing the feedstock into the pyrolysis reactor.

10. The method of claim 5, further comprising introducing a second feedstock into a second pyrolysis reactor; and producing a second char, a second liquid fuel, and a second gaseous fuel using the second pyrolysis reactor.

11. The method of claim 5, further comprising injecting oxygen produced by the electrolysis unit into a gasification region of the gasifier.

12. The method of claim 11, further comprising injecting carbon dioxide into a gasification region of the gasifier.

13. The method of claim 12, further comprising heating the oxygen and carbon dioxide before injecting the oxygen and the carbon dioxide into the gasification region.

14. The method of claim 5, further comprising producing additional electrical power using a steam turbine and providing the additional electrical power to the electrolysis unit.

15. A system, comprising:
   a pyrolysis reactor configured to receive feedstock and produce char and a liquid fuel;
   a gasifier configured to receive the char and produce carbon monoxide and activated carbon;
   an electrolysis unit configured to convert water to oxygen and hydrogen;
   a combustion turbine configured to receive the liquid fuel produced by the pyrolysis reactor and to receive the oxygen produced by the electrolysis unit and to produce electrical power for use by the electrolysis unit; and
   a boiler configured to produce steam that is supplied to the combustion turbine to control a temperature of combustion within the combustion turbine;
   the system configured to provide a gaseous fuel to the boiler to produce heated exhaust with the boiler and dry the feedstock with the heated exhaust produced by the boiler prior to introducing the feedstock into the pyrolysis reactor.

16. The system of claim 15, wherein the boiler is configured to receive the gaseous fuel by the pyrolysis reactor.

17. The system of claim 16, further comprising a combined cycle unit configured to heat feed water for the boiler, wherein the combined cycle unit is configured to use exhaust from the combustion turbine to heat the feed water.

18. The system of claim 17, wherein the combined cycle unit is further configured to condense liquid from the exhaust of the combustion turbine to pre-heat the feed water for the boiler, wherein the boiler is configured to convert the pre-heated feed water to steam for use by the combustion turbine.

19. The system of claim 16, further comprising a steam turbine configured to receive steam from the boiler and to produce additional electrical power for use by the electrolysis unit.

20. The system of claim 15, further comprising a second pyrolysis reactor configured to receive a second feedstock and produce a second char, a second liquid fuel, and a second gaseous fuel.

* * * * *

UNITED STATES PATENT AND TRADEMARK OFFICE
CERTIFICATE OF CORRECTION

PATENT NO. : 11,002,192 B2
APPLICATION NO. : 17/037799
DATED : May 11, 2021
INVENTOR(S) : Mack D. Bowen et al.

Page 1 of 1

It is certified that error appears in the above-identified patent and that said Letters Patent is hereby corrected as shown below:

In the Specification

In Column 3, Lines 60-61, "pyrolysis reactor" should read -- electrolysis unit --.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*